Oct. 12, 1937.  E. H. CARTER ET AL  2,095,857
PURIFICATION OF PRODUCTS OF THE DESTRUCTIVE DISTILLATION OF WOOD
Filed Jan. 8, 1935
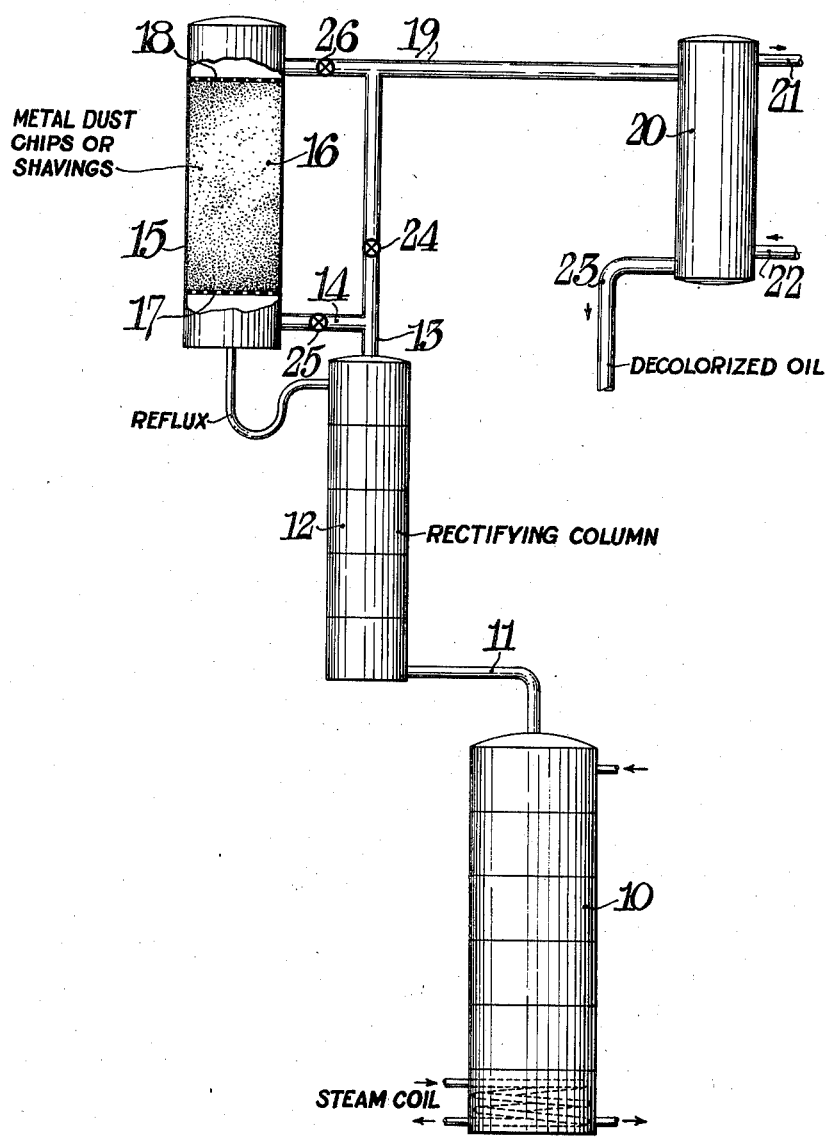
Inventors:
Edward H. Carter & Louis J. Figg, Jr.

Patented Oct. 12, 1937

2,095,857

UNITED STATES PATENT OFFICE 2,095,857

PURIFICATION OF PRODUCTS OF THE DESTRUCTIVE DISTILLATION OF WOOD

Edward H. Carter and Louis J. Figg, Jr., Kingsport, Tenn., assignors, by mesne assignments, to Eastman Kodak Company, Jersey City, N. J., a corporation of New Jersey Application January 8, 1935, Serial No. 877

8 Claims. (Cl. 202—67)

This invention relates to a method for purifying pyroligneous crude distillates and distilled products derived therefrom and more particularly to the purification of wood oils, including alcohol oils, light acid oils, methyl acetone, methanol, allyl alcohol, acetone, and other non-acidic products which result from the distillation and refining of the pyroligneous crude resulting from destructive distillation of wood.

As is well known, when hard wood is subjected to destructive distillation to produce charcoal, a crude liquid known as pyroligneous liquor is obtained which contains tar, acetic acid, methanol, and various oily substances. This crude pyroligneous liquor is subjected to settling to remove tar and then to distillation to separate a crude form of acetic acid from the methanol, after which both the acetic acid and alcohol fractions are subjected to further treatment, such as distillation, washing, etc., to obtain (1) concentrated acetic acid and (2) various fractions or distillates known as wood oils and including alcohol oils, light acid oils, methyl acetone, methyl alcohol, allyl alcohol, acetone and other substances. The preparation of these wood oils is more particularly described in the U. S. Patent to L. J. Figg, Jr., No. 1,975,091. It is also well known that these wood oils contain certain impurities of a corrosive nature. They can be stored in copper or aluminum containers without darkening in color to any great extent, and without corrosion of the copper or aluminum. It is equally well known that these same materials become dark red in color, and are very corrosive when stored in galvanized iron or steel containers, or whenever they come in contact with iron.

This invention has as an object the purification of the impure intermediate or wood oils obtained in distilling pyroligneous crude. Another object is to remove objectionable coloring matter from such distillates. A further object is to provide a process for preventing the corrosion of iron and steel containers in which these distillates are stored after distillation. A still further object is to provide a process for purification of pyroligneous crude distillates which can be carried out without frequent renewals of the purifying material. A specific object is to provide a purified wood oil which is characterized by the absence of objectionable color, is more stable to light, and entirely non-corrosive to iron and steel. Other objects will appear hereinafter.

These objects are accomplished by the following invention which, in its broader aspects, comprises vaporizing non-acidic pyroligneous crude distillates or wood oils and passing the vapors through a mass of metallic pieces or particles. The distillate thus comes into extremely intimate contact with the metallic surface and this brings about a decomposition (reduction) of the various impurities contained therein into non-corrosive substances which are colorless and at the same time stable, both with respect to the influence of light and with respect to contact with iron and other metals.

In the following example and description, we have set forth several of the preferred embodiments of our invention but they are included merely for purposes of illustration and not as a limitation thereof.

The single figure of the drawing is a diagrammatic elevation of one form of apparatus in which our invention may be carried out.

Referring to the drawing, the numeral 10 designates a conventional type of still supplied with appropriate heating means (as shown) in which the non-acidic pyroligneous crude distillate or wood oil mixture is heated, the vapors therefrom passing through conduit 11 to a rectifying column 12. From the rectifying column the vapors pass by means of conduits 13 and 14, provided with appropriate valves 24 and 25 respectively, into purifying column 15. As the vapors pass upwardly through column 15 they come into intimate contact with a permeable mass 16 of iron or other metallic reducing metal in the form of dust, chips, shavings, wool or the like, suitably supported on perforate member 17. A second perforate member 18 superimposed on, or placed above, the material prevents carrying over of metallic particles as the purified vapors pass into the lead-off conduit 19.

As will be understood, the vapors passing through the mass of metallic particles are decolorized and stabilized by the action of the metal on the various impurities (presumably of a phenolic nature) contained in the crude wood oil distillate. The decolorized and stabilized vapors then pass by means of conduit 19, controlled by valve 26, to, and are condensed in, condenser 20 provided with a suitable source of cooling medium conducted thereto by means of conduit 21 and led therefrom through conduit 22. The purified condensate finally passes from the condenser to storage through conduit 23.

It will of course be understood that the above description is merely illustrative, and many modifications of our process are possible within the scope of the invention. While we have referred to the use of iron-dust or chips, the metal may be in any convenient physical form which provides a large amount of contact surface, such as dust, chips, flakes, shavings, wool, screening and the like. When we employ the term, pieces, we refer to any of the aforementioned physical forms comprised of the metals or alloys described herein.

While we have found it convenient to illustrate our invention by reference to the use of iron as the reducing, stabilizing and decolorizing agent, it will be apparent that similar reducing metals, such as steel, various alloys of iron, aluminum, copper and its alloys, such as bronze and brass and other alloys, such as those of lead, tin and antimony and the like, or in fact any metal or alloy thereof which does not give rise to undesirable coloration of the distillate vapors, may be employed.

It will be apparent that our process has many advantages over purification processes heretofore known. Such processes have in most instances been based upon the idea of bringing the pyroligneous crude distillate in the liquid phase into contact with the purifying agent and then distilling or otherwise separating the purified material from the agent. In this prior practice it is out of the question to obtain the intimacy of contact between the crude material and the purifying agent made possible according to our invention in which the material undergoing treatment comes in contact with the purifying agent in the vapor phase. Moreover, when operating in the liquid phase, the tarry impurities contained in the material have a strong tendency to coat over the surface of the particles of purifying agent and cut down its effectiveness. We have found, on the other hand, that vapor phase purification eliminates the accumulation of tar on the purifying agent, since the tar is left behind in the still and only the more volatile materials contact with the metal. We have also found that by operating in the vapor phase a greater degree of stabilization and purity of the product is made possible than has heretofore been the case with liquid phase purifying methods. In addition our process requires the use of much less of the purifying agent and far less frequent renewal than liquid phase operations.

The product produced according to our process is characterized by extreme clarity and a high degree of stability. It is entirely non-corrosive with respect to iron and steel containers, in which it may be stored for long periods of time without adverse effect upon the metal. While we offer no theory to explain the chemical action taking place in our process, it is very probably a reduction of various phenolic bodies contained in the crude material and a corresponding oxidation of the metallic iron or other metal to an oxide.

By the term "wood oils" as used herein and in the claims, we refer to the non-acidic distillates obtained by distilling pyroligneous liquor obtained in the destructive distillation of wood. Such a material is of a relatively complex nature and includes such bodies as alcohol oils, light acid oils, methyl acetone, methanol, allyl alcohol, acetone, as well as certain bodies, presumably of a phenolic nature, which give rise to coloration or decomposition and lend corrosive properties to the crude material especially when stored in iron or steel containers.

What we claim as our invention and desire to be secured by Letters Patent of the United States is:

1. The method of purifying wood oils obtained in the destructive distillation of wood and containing constituents rendering the wood oils corrosive to ferrous containers, to render the wood oils capable of contact with ferrous containers without corrosion, which comprises vaporizing the oils and thereupon passing the oil vapors into contact with a mass of pieces of iron.

2. A method for treating wood oils containing constituents rendering the wood oils corrosive to ferrous containers, which comprises heating the corrosive wood oils to obtain vapors therefrom, subjecting the wood oil vapors to a rectification treatment, contacting the vapors from the rectification treatment with sufficient pieces of reducing metal to remove the corrosive constituents from the vapors, and condensing and withdrawing the purified wood oils.

3. A method for treating wood oils containing constituents rendering the wood oils corrosive to ferrous containers, which comprises heating the corrosive wood oils to obtain vapors therefrom, subjecting the wood oil vapors to a rectification treatment, contacting the vapors from the rectification treatment with a mass of pieces of iron to remove the corrosive constituents from the vapors, and condensing and withdrawing the purified wood oils.

4. A method for treating wood oils containing constituents rendering the wood oils corrosive to ferrous containers, which comprises heating the corrosive wood oils to obtain vapors therefrom, subjecting the wood oil vapors to a rectification treatment, contacting the vapors from the rectification treatment with sufficient pieces of reducing metal to remove the corrosive constituents from the vapors, condensing and withdrawing the purified wood oils, and thereafter placing the purified wood oils in contact with galvanized iron, steel or iron containers.

5. A method for treating wood oils obtained in the destructive distillation of wood and containing constituents rendering the wood oils corrosive to ferrous containers, to render the wood oils capable of contact with ferrous containers without corrosion thereof, which comprises subjecting the corrosive wood oils to a distillation treatment wherein the corrosive wood oils in vapor phase are brought into intimate contact with pieces of a reducing metal, condensing the purified wood oils, and thereafter placing the purified wood oils in contact with galvanized iron, steel or iron containers.

6. A process for treating wood oils obtained in the destructive distillation of hard wood and containing constituents rendering wood oils corrosive to ferrous containers, to render the wood oils capable of contact with ferrous containers without corrosion thereof during the storing of the heated oils, which comprises subjecting corrosive hard wood oils to a distillation treatment wherein the corrosive hard wood oils are vaporized and brought into intimate contact with pieces of iron, condensing the treated hard wood oils and thereafter placing the treated hard wood oil in contact with galvanized iron, steel or iron containers.

7. A process for treating hard wood oils containing constituents rendering the hard wood oils corrosive to ferrous containers, which comprises heating corrosive hard wood oils to obtain vapors therefrom, subjecting the hard wood oil vapors to a rectification treatment, contacting the hard wood oil vapors from the rectification treatment with pieces of iron for the removal of corrosive constituents from the vapors, and condensing and withdrawing the non-corrosive hard wood oils.

8. A method for treating wood oils containing constituents rendering the wood oils corrosive to ferrous containers, which comprises heating the corrosive wood oils to obtain vapors therefrom, contacting the corrosive vapors with pieces of a reducing metal which do not give rise to undesirable colorations of the distillate vapors, in sufficient quantity and for a sufficient length of time to remove at least a substantial part of the corrosive constituents of the vapors, condensing and withdrawing the purified wood oils.

EDWARD H. CARTER.
LOUIS J. FIGG, Jr.

CERTIFICATE OF CORRECTION.

Patent No. 2,095,857. October 12, 1937.

EDWARD H. CARTER, ET AL.

It is hereby certified that error appears in the printed specification of the above numbered patent requiring correction as follows: Page 2, second column, line 62, claim 6, for the word "heated" read treated; and that the said Letters Patent should be read with this correction therein that the same may conform to the record of the case in the Patent Office.

Signed and sealed this 7th day of December, A. D. 1937.

(Seal)

Henry Van Arsdale,
Acting Commissioner of Patents.